United States Patent Office 3,310,317
Patented Mar. 21, 1967

3,310,317
CART
John E. Luff, Yucaipa, Calif., assignor to The Cal-Dak Company, Los Angeles, Calif., a corporation of California
Filed Jan. 11, 1965, Ser. No. 424,553
3 Claims. (Cl. 280—36)

This invention relates to conveyances having receptacles or baskets for carrying merchandise or the like, and more particularly to an adjustable shopping cart.

In the past, it has been the practice to construct a shopping cart with a relatively deep rectangular wire basket. That is, the basket may be two or three feet deep, or even deeper. This means that in shopping for a whole basket full of groceries, some food packages at the bottom of the basket can be completely crushed. Further, when only a few items are placed in and removed from the basket, these items can be loaded or unloaded only by the expenditure of some substantial physical effort in reaching down inside the basket to the bottom of the basket.

In accordance with the device of the present invention, the above-described and other disadvantages of the prior art are overcome by providing a shopping cart having a side framework which folds to provide a stable deep basket, but which is adjustable to provide a shelf intermediate a bottom basket framework and the top of the basket.

In accordance with the present invention, the adjustable shelf makes it possible to load a small number of packages thereon, and a small number in addition on the bottom framework. The packages on the bottom framework are thus completely relieved of the weight of those packages on the shelf. It is therefore possible to keep all of the packages from being crushed or damaged. Further, if it is desired that only a small number of packages be transported, only the shelf need be loaded. Loading and unloading are therefore made easier in that the shelf is higher than the bottom framework and packages thereon are thus made more easily accessible than a few would be in the bottom of a relatively deep shopping cart basket constructed in accordance with the prior art.

As stated previously, the cart of the present invention may be adjusted to provide a stable deep basket as well as one with an intermediate shelf. It is therefore another feature of the present invention that the adaptability of the cart to receive large packages is not diminished by the addition of the adjustable shelf.

The above-described and other advantages of the present invention will be better understood from the following description when considered in connection with the accompanying drawings.

In the drawings which are to be regarded as merely illustrative:

FIG. 3 is an enlarged sectional view taken on the line 3—3 of the shopping cart shown in FIG. 1; and FIG. 4 is a broken enlarged sectional view of the shopping cart showing how the shelf thereof is adjustable.

Figure 1:
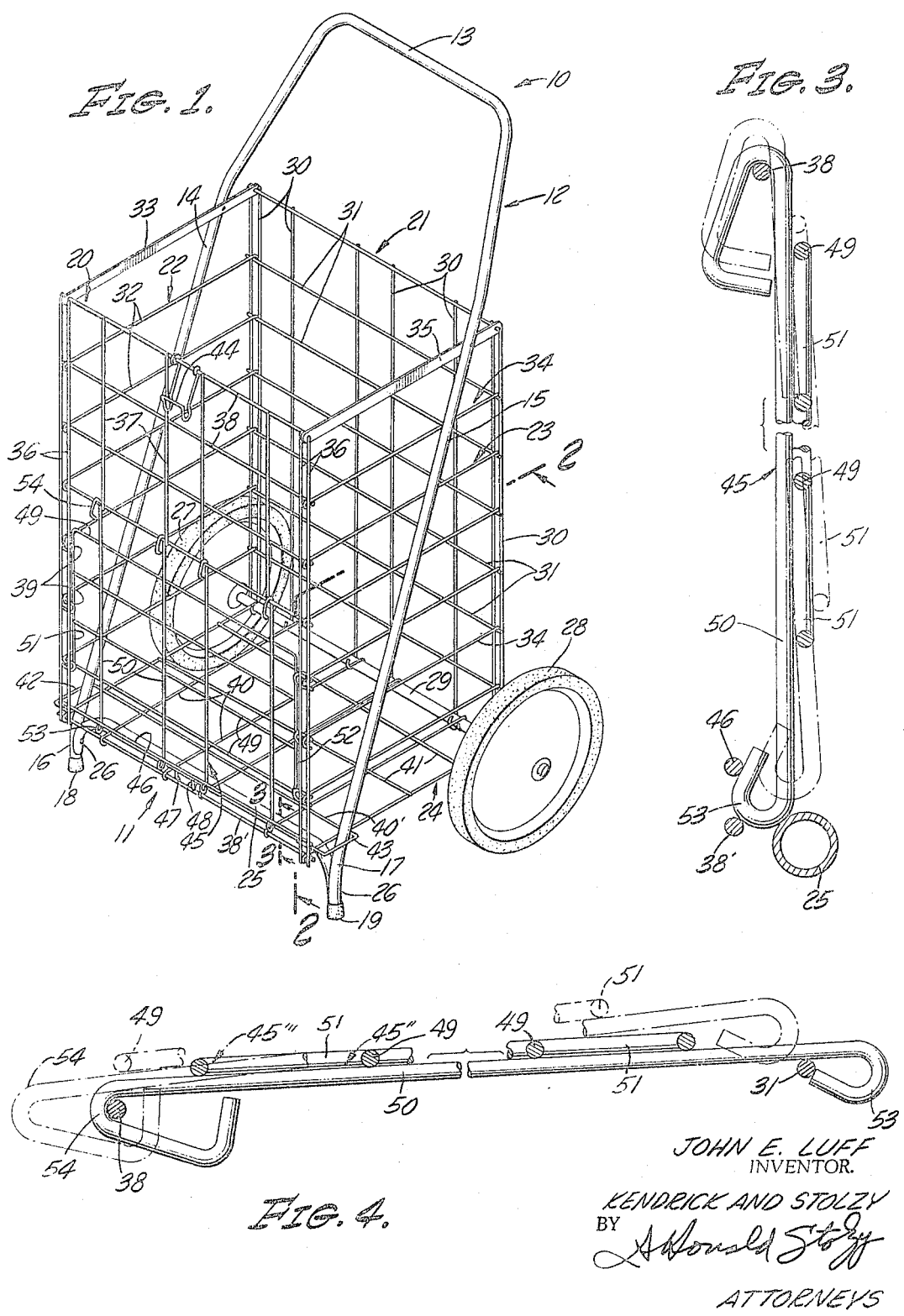
FIG. 1 is a perspective view of the shopping cart constructed in accordance with the present invention.

In the drawing in FIG. 1, a shopping cart 10 constructed in accordance with the present invention is shown.

Shopping cart 10 includes a basket 11 carried by a U-shaped member 12. Member 12 has a bight portion 13 which acts as a handle, legs 14 and 15 which act as legs for the cart 10, and feet 16 and 17. Rubber caps 18 and 19 cover feet 16 and 17, respectively.

Basket 11 has front and rear frameworks 20 and 21 side frameworks 22 and 23, and a bottom framework 24.

A brace or cross bar 25 is riveted at 26 to feet 16 and 17, respectively. Cross bar 25 provides a support for bottom basket framework 24 and a brace for legs 14 and 15 of member 12.

Although the cart 10 shown in FIG. 1 is somewhat different, in some other details from the cart 10 shown in FIG. 1 of Best U.S. Patent No. 2,920,900, the cart 10 shown in FIG. 1 herein may in fact be identical to that shown in FIG. 1 of the said Best patent, with the exception of front framework 20.

Cart 10 rests on feet 16 and 17. It also rests upon wheels 27 and 28. Wheels 27 and 28 are conventional and are mounted conventionally on a fixed axle 29.

Rear framework 21 has a set of vertical wires 30 which are welded to axle 29. Rear framework 21 has a set of horizontal wires 31 which are welded to vertical wires 30.

Side framework 22 has a set of wires 32 and a top bar 33. Side framework 23 has a set of wires 34 and a top bar 35. Front framework 20 has four vertical wires 36 that run the full height of basket 11. Two of the wires 36 are disposed adjacent the side of framework 22 and two of the wires 36 are disposed adjacent the side of framework 23. Front framework 20 has long horizontal wires 38 and short horizontal wires 39 which are welded to vertical wires 36. Vertical wires 37 are welded to horizontal wires 38.

All welding described herein may be resistance spot welding, as is conventional.

As in the case of the said Best patent, the ends of side framework wires 32 and 34 are loosely bent around corresponding horizontal wires in front and rear frameworks 20 and 21. Bars 33 and 35 are rotatably mounted about the uppermost horizontal wires in front and rear frameworks 20 and 21. U-shaped member 12 is pivoted from bars 33 and 35.

Bottom framework consists of sets of longitudinal wires 40 and transverse wires 41 welded together. The rearward ends of longitudinal wires 40 are rotatably bent around axle 29. Front framework 20 has a lower horizontal wire 38′ around which the forward ends of wires 40 are loosely bent.

A transverse wire 40′ in bottom framework 24 extends outwardly beyond each side thereof to provide rigid loops 42 and 43 to encircle cart legs 14 and 15, respectively.

Thus far, in this description, note will be taken that, with the exception of the short horizontal wires 39, the structure described may be identical to that shown in the said Best patent. The same is true of a hook 44 which engages handle 13 to hold cart 10 in a collapsed position, the cart 10 being collapsible in a manner similar to that indicated in FIG. 4 of the said Best patent.

The remaining portion of front basket framework 20 includes an adjustable shelf 45, and a wire 46 welded to wire 40′ and to short, vertical, bracing wires 47 and 48.

Shelf 45 has five transverse wires 49, and four longitudinal wires 50. A pair of end wires 51 and 52 are also provided. Wires 50, 51 and 52 are welded to wires 49. Shelf 45 is rotatable from a position shown in solid lines at 45 in FIG. 2 to a position shown in dotted lines at 45′. When shelf 45 is in the solid line position shown in FIG. 2, the lower ends of wires 50 rest inbetween wires 46 and 38′, as shown in FIG. 3. Note will be taken from FIG. 3 that wires 50 are bent into a loop 53 at their lower ends to fit in a secure position between wires 46 and 38′.

Figure 2:
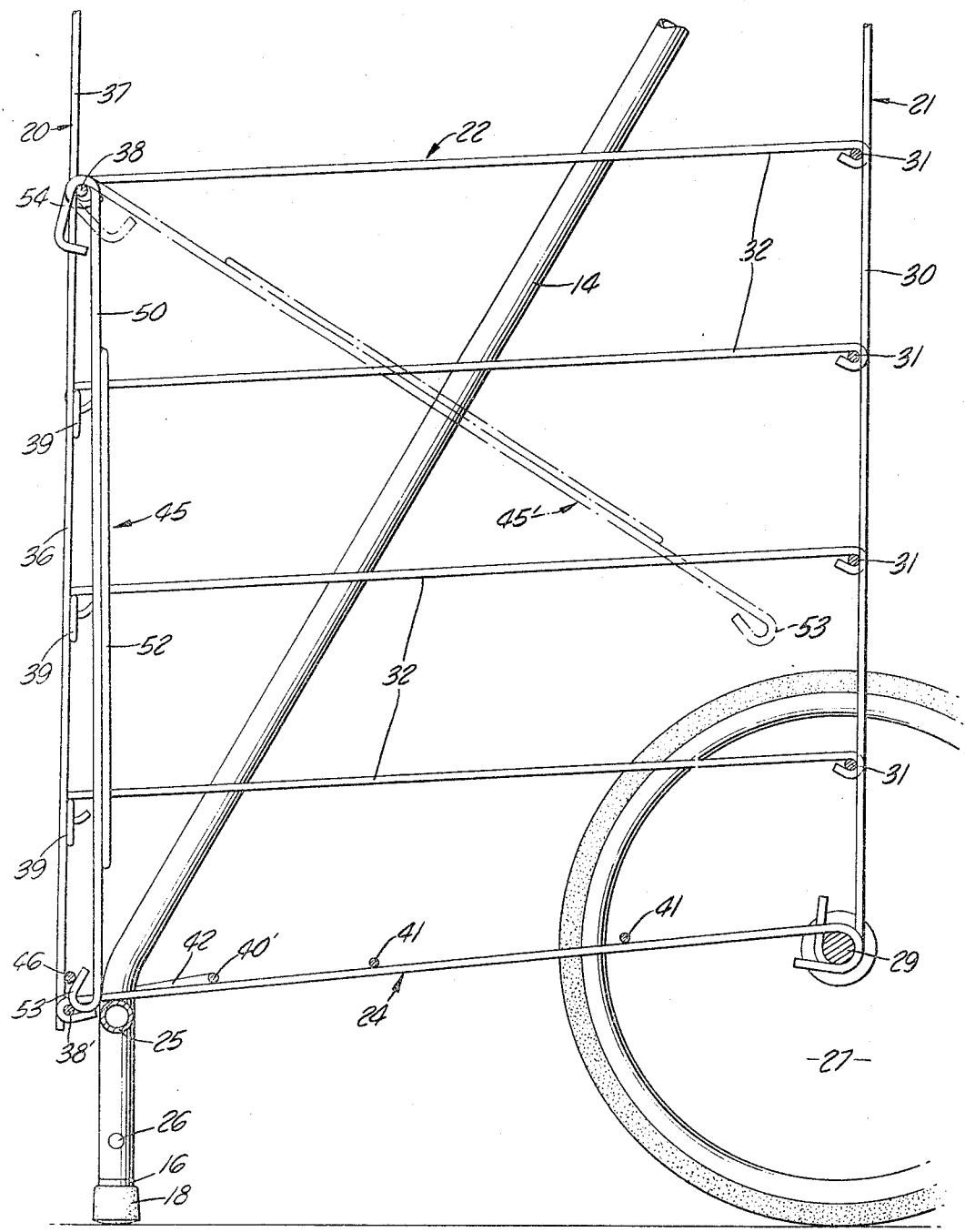
FIG. 2 is a sectional view taken on the line 2—2 of the shopping cart shown in FIG. 1.

When shelf 45 is moved to the position at 45′ shown in FIG. 2, or vice versa, movement thereof to mount the shelf in a horizontal position, or to lower it, may be made from one of the two positions indicated at 45″ and 45‴ shown in FIG. 4. Note will be taken that wire loop 53 of wires 50 serve a dual purpose. They keep shelf 45 stably in the position shown in FIG. 3. They also keep shelf 45 in a stable horizontal position by hooking rearwardly around a wire 31 in rear framework 21. Wires 50 have forward loops 54 which extend around the lowermost horizontal wire 38 in front framework 20. Note will be taken that loops 54 are elongated so as to accommodate the motion demonstrated at 45″ and 45‴. In this respect, the hole of loop 54 is at least as long as the outside dimension of loop 53.

From the foregoing it will be appreciated that cart 10 may be employed for the same purpose as the cart of the said Best patent when shelf 45 is positioned vertically. That is, cart 10 will accept relatively large packages. However, shelf 45 may be positioned as at 45′ shown in FIG. 2. There are several substantial advantages which are attendant upon the use of the shelf 45 in the position 45′.

In the first place, a small number of packages may be loaded onto shelf 45 and a small number of packages may be loaded onto bottom framework 24. In this case, the packages placed upon bottom framework 24 will be completely relieved of the weight of those packages on shelf 45. Packages on bottom framework 24 will therefore not be crushed or damaged as they were in the case of prior art shopping carts.

In addition, if only a small number of packages are to be transported, they may be loaded onto shelf 45 in its horizontal position. Loading and unloading of the cart 10 therefore is made easier in that the shelf 45 is higher than the bottom framework 24. Packages on the shelf 45 are therefore more easily accessible than they would be on the bottom framework of a basket positioned as indicated at 24 in FIG. 1.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In a collapsible shopping cart, the combination comprising: a rectangular wire basket having two side frameworks, a front framework, a rear framework and a bottom framework, said basket being foldable to a collapsed position at the front and rear edges of said bottom framework, said front and bottom frameworks being collapsible toward said rear framework, said front framework having a reticulated construction, an upper portion of said front framework having a lower horizontal wire, a lower portion of said front framework having upper oversize wire loops extending around said upper portion horizontal wire, said lower portion also having downwardly extending wires with forwardly extending projections, said front framework also having a pair of spaced horizontal wires to receive said projections, said rear framework having a horizontal wire to rest beneath said downwardly extending wires forward of said projections thereon, said rear framework horizontal wire being at the same height as the lower horizontal wire of the upper portion of said front framework.

2. In a shopping cart, a basket comprising: a rear side, and a front side including a lower portion and a hinge movably connecting said lower portion to an upper fixed portion, said front side also having a first rod extending across the bottom thereof, said lower portion having projection means at the lower end thereof to fit below said first rod, said rear side also having a second rod spaced from said front side a distance such that said lower portion thereof may rest on said second rod with said projection means spaced rearward thereof.

3. In a shopping cart, the combination comprising: approximately parallel front and rear reticulated frameworks; and side frameworks connecting said front and rear frameworks to provide a substantially rectangular basket, said front framework including an upper fixed portion having a lower first horizontal rod, said front framework also having a lower portion with wires extending thereacross, the upper ends of said wires having first loops disposed loosely around said first rod, said rear framework having a second horizontal rod at the height of said first rod, said wires having second loops forming forwardly extending projections, said front framework having a third rod to stop said wires above said second loops, said lower framework portion being adjustable to a horizontal position with said wires resting on said second rod and said second loops depending from said wires in a position rearwardly of said second rod hooking therearound, said first loops having a length such that said lower framework portion may be unhooked from said second rod.

References Cited by the Examiner

UNITED STATES PATENTS

| D. 182,180 | 2/1958 | Grebow | 280—36 X |
| 2,668,734 | 2/1954 | Bridge | 296—1 |
| 2,743,838 | 5/1956 | Peterson | 220—19 |
| 2,898,122 | 8/1959 | Beckner | 220—19 |
| 3,207,526 | 9/1965 | Brodeck | 280—36 |

FOREIGN PATENTS 589,159   12/1959   Canada.

BENJAMIN HERSH, *Primary Examiner.*

M. S. SALES, *Assistant Examiner.*